(12) United States Patent
Li et al.

(10) Patent No.: US 11,324,066 B2
(45) Date of Patent: May 3, 2022

(54) DYNAMIC DOWNLINK MONITORING TECHNIQUES FOR COMMUNICATION SYSTEMS

(71) Applicant: QUALCOMM Incorporated, San Diego, CA (US)

(72) Inventors: Junyi Li, Chester, NJ (US); Rajat Prakash, San Diego, CA (US); Piyush Gupta, Bridgewater, NJ (US); Chong Li, Weehawken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/391,247

(22) Filed: Apr. 22, 2019

(65) Prior Publication Data

US 2019/0327785 A1    Oct. 24, 2019

Related U.S. Application Data

(60) Provisional application No. 62/661,400, filed on Apr. 23, 2018.

(51) Int. Cl.
*H04W 76/27* (2018.01)
*H04L 5/00* (2006.01)
*H04W 72/04* (2009.01)

(52) U.S. Cl.
CPC .......... *H04W 76/27* (2018.02); *H04L 5/0055* (2013.01); *H04W 72/042* (2013.01); *H04W 72/0446* (2013.01)

(58) Field of Classification Search
None
See application file for complete search history.

(56) References Cited

U.S. PATENT DOCUMENTS 10,594,468 B2 * 3/2020 Liao .................. H04W 72/1273
10,721,653 B2 * 7/2020 Futaki .................. H04W 28/20
(Continued)

OTHER PUBLICATIONS

"3rd Generation Partnership Project; Technical Specification Group Radio Access Network; NR; Medium Access Control (MAC) protocol specification (Release 15)", 3GPP Standard; Technical Specification; 3GPP TS 38.321, 3rd Generation Partnership Project (3GPP), Mobile Competence Centre; 650, Route Des Lucioles ; F-06921 Sophia-Antipolis Cedex ; France, vol. RAN WG2, No. V15.1.0, Apr. 2, 2018 (Apr. 2, 2018), pp. 1-67, XP051450732, [retrieved on Apr. 2, 2018] Par. 5.3.2, Par. 5.4.2, Par. 5.15.

(Continued)

*Primary Examiner* — John D Blanton
(74) *Attorney, Agent, or Firm* — Patterson & Sheridan, L.L.P.

(57) ABSTRACT

Methods, systems, and devices for wireless communications are described. One method may include an eNB predetermining a plurality of bandwidth parts to monitor based on resource reservation information received from at least one base station, and transmitting information indicative of the predetermined bandwidth parts in a radio resource control (RRC) message. In some cases, a base station may transmit information indicative of predetermined bandwidth parts including a monitoring schedule to monitor either the first bandwidth part or the second bandwidth part in a timeslot of a set of timeslots. Another method may include receiving a predetermined monitoring schedule from a base station, and selecting a plurality of bandwidth parts to monitor on a physical downlink control channel based on the received schedule.

17 Claims, 13 Drawing Sheets

(56) References Cited

U.S. PATENT DOCUMENTS

| | | | | |
|---|---|---|---|---|
| 2005/0117536 | A1* | 6/2005 | Cho | H04W 72/042 370/328 |
| 2014/0079015 | A1* | 3/2014 | Kim | H04L 27/0006 370/329 |
| 2015/0289234 | A1* | 10/2015 | Zhao | H04L 1/0073 370/329 |
| 2015/0296474 | A1* | 10/2015 | Cai | G01S 5/14 455/456.5 |
| 2017/0164242 | A1* | 6/2017 | Zhang | H04W 28/26 |
| 2018/0270801 | A1* | 9/2018 | Novlan | H04W 56/0015 |
| 2018/0317221 | A1* | 11/2018 | Yasukawa | H04W 72/0413 |
| 2018/0324773 | A1* | 11/2018 | Fu | H04L 5/0082 |
| 2019/0045491 | A1* | 2/2019 | Zhang | H04L 5/001 |
| 2019/0053287 | A1* | 2/2019 | Lin | H04L 5/0051 |
| 2019/0059093 | A1* | 2/2019 | Cheng | H04L 5/0082 |
| 2019/0082425 | A1* | 3/2019 | Li | H04W 56/0005 |
| 2019/0090299 | A1* | 3/2019 | Ang | H04L 5/001 |
| 2019/0098655 | A1* | 3/2019 | Shih | H04B 7/0617 |
| 2019/0104543 | A1* | 4/2019 | Park | H04L 1/1671 |
| 2019/0104554 | A1* | 4/2019 | Amuru | H04W 72/042 |
| 2019/0149308 | A1* | 5/2019 | Son | H04L 5/0094 375/260 |
| 2019/0173620 | A1* | 6/2019 | Oh | H04L 5/0023 |
| 2019/0182807 | A1* | 6/2019 | Panteleev | H04L 1/1819 |
| 2019/0182871 | A1* | 6/2019 | Aminaka | H04W 74/008 |
| 2019/0182890 | A1* | 6/2019 | Jeong | H04W 76/36 |
| 2019/0200396 | A1* | 6/2019 | Agiwal | H04W 28/20 |
| 2019/0215871 | A1* | 7/2019 | Aiba | H04W 74/0833 |
| 2019/0230513 | A1* | 7/2019 | Ang | H04L 5/0096 |
| 2019/0261406 | A1* | 8/2019 | Kim | H04W 72/1289 |
| 2019/0261425 | A1* | 8/2019 | Park | H04L 1/0026 |
| 2019/0274032 | A1* | 9/2019 | Chatterjee | H04W 48/12 |
| 2019/0281504 | A1* | 9/2019 | Su | H04W 28/20 |
| 2019/0281545 | A1* | 9/2019 | Kim | H04W 52/0216 |
| 2019/0281591 | A1* | 9/2019 | Nogami | H04J 11/0069 |
| 2019/0305916 | A1* | 10/2019 | Liao | H04L 5/0092 |
| 2019/0313437 | A1* | 10/2019 | Jung | H04L 5/0053 |
| 2019/0319833 | A1* | 10/2019 | Nagaraja | H04W 36/0085 |
| 2019/0342944 | A1* | 11/2019 | Chatterjee | H04W 76/27 |
| 2019/0357181 | A1* | 11/2019 | Xiong | H04L 5/0053 |
| 2020/0037260 | A1* | 1/2020 | Fu | H04L 5/0092 |
| 2020/0059327 | A1* | 2/2020 | Kini | H04L 5/0055 |
| 2020/0092018 | A1* | 3/2020 | Hwang | H04W 24/08 |
| 2020/0119895 | A1* | 4/2020 | Choi | H04L 5/00 |
| 2020/0178189 | A1* | 6/2020 | Lei | H04L 5/0048 |
| 2020/0178353 | A1* | 6/2020 | Yang | H04L 1/0001 |
| 2020/0187198 | A1* | 6/2020 | Rico Alvarino | H04L 5/0053 |
| 2020/0187293 | A1* | 6/2020 | Kuang | H04W 76/27 |
| 2020/0236636 | A1* | 7/2020 | Liu | H04W 72/0446 |
| 2020/0404689 | A1* | 12/2020 | Zhou | H04L 5/001 |

OTHER PUBLICATIONS

"3rd Generation Partnership Project; Technical Specification Group Radio Access Network; NR; Physical layer procedures for control (Release 15)", 3GPP Draft; 38.213-F10, 3rd Generation Partnership Project (3GPP), Mobile Competence Centre; 650, Route Des Lucioles ; F-06921 Sophia-Antipolis Cedex ; France, Apr. 9, 2018 (Apr. 9, 2018), pp. 1-77, XP051435591, Retrieved from the Internet: URL: http://www.3gpp.org/ftp/tsg%5Fran/WG1%5FRL1/Clean/ [retrieved on Apr. 9, 2018], Par. 5, Par. 12.

Convida Wireless: "Discussion on BWP Design", 3GPP TSG RAN WG1 Meeting NR#3, 3GPP Draft; R1-1716647_Discussion_BWP_Design, 3rd Generation Partnership Project (3GPP), Mobile Competence Centre; 650 Route Des Lucioles; F-06921 Sophia-Antipolis Cedex; France, vol. RAN WG1, No. Nagoya, Japan; Sep. 18, 2017-Sep. 21, 2017, Sep. 17, 2017 (Sep. 17, 2017), 5 Pages, XP051340097, Retrieved from the Internet: URL: http://www.3gpp.org/ftp/Meetings_3GPP_SYNC/RAN1/Docs/ [retrieved on Sep. 17, 2017], p. 2, line 2, Par. 2.1, figure 1(b), section 1, 2.1, 2.3.

Huawei., et al., "Summary of Remaining Issues on Bandwidth Part and Wideband Operation", 3GPP Draft; R1-1801347, 3rd Generation Partnership Project (3GPP), Mobile Competence Centre, 650, Route Des Lucioles ; F-06921 Sophia-Antipolis Cedex, France, vol. RAN WG1, No. Athens, Greece; Sep. 26, 2018-Mar. 2, 2018, Feb. 17, 2018 (Feb. 17, 2018), 13 Pages, XP051397511, Retrieved from the Internet: URL: http://www.3gpp.org/ftp/tsg%5Fran/WG1%5FRL1/TSGR1%5F92/Docs/ [retrieved on Feb. 17, 2018], Par. 3.4.

International Search Report and Written Opinion—PCT/US2019/028774—ISA/EPO—dated Sep. 12, 2019.

* cited by examiner

DYNAMIC DOWNLINK MONITORING TECHNIQUES FOR COMMUNICATION SYSTEMS

CLAIM OF PRIORITY

This application claims the benefit of U.S. Provisional Application Ser. No. 62/661,400, entitled "DYNAMIC DOWNLINK MONITORING TECHNIQUES FOR COMMUNICATION SYSTEMS" and filed on Apr. 23, 2018, which is expressly incorporated by reference herein in its entirety.

TECHNICAL FIELD

Certain aspects of the present disclosure generally relate to wireless communications and, more particularly, to techniques for dynamic downlink monitoring in dynamic spectrum reuse, including techniques to optimize power consumption in user devices.

INTRODUCTION

Wireless communications systems are widely deployed to provide various types of communication content such as voice, video, packet data, messaging, broadcast, and so on. These systems may be capable of supporting communication with multiple users by sharing available system resources (e.g., time, frequency, and power). Examples of such multiple-access systems include fourth generation (4G) systems such as LongTerm Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless multiple access communications may be improved by optimizing system resources such as UE power. A UE may monitor a downlink e.g., for control information, to synchronize with a base station, etc, and may have the capability to monitor large channel bandwidths e.g. 20 mHz for LTE. However, monitoring large bandwidths may cause a UE to expend unneccesary power. There exists a need for improvements in UE power utilization.

BRIEF SUMMARY

Techniques described below relate to improved methods, systems, devices, or apparatuses that support techniques for dynamic downlink monitoring in dynamic spectrum reuse for communication systems. Generally, the described techniques provide a method for predetermining a plurality of bandwidth parts to monitor based on resource reservation information received from at least one base station, and transmitting information indicative of the predetermined bandwidth parts in a radio resource control (RRC) message. In some cases, a base station may transmit information indicative of predetermined bandwidth parts including a monitoring schedule to monitor either the first bandwidth part or the second bandwidth part in a timeslot of a set of timeslots. In some cases, a UE may receive a predetermined monitoring schedule from a base station, and select a plurality of bandwidth parts to monitor on a physical downlink control channel based on the received schedule. In some examples, a UE may monitor a first bandwidth part in at least one portion of a first timeslot and monitor a second bandwidth part in at least one portion of a second timeslot. In some examples, at least one base station in a second cell may receive a first resource reservation message from a first cell, the message comprising information about a plurality of slots reserved for transmission for a first time duration, the base station may receive from the first cell a second resource reservation message comprising information about a first subset of the plurality of slots reserved for transmission for a second time duration, and the base station may utilize at least one of the plurality of slots that is not in the first subset for transmission with a user equipment in the second cell. In some cases, the base station may receive from the first cell a third resource reservation message comprising information about a second subset of the plurality of slots reserved for transmission for a third time duration, and utilize at least one of the plurality of slots that is not in the second subset for transmission with a user equipment in the second cell, wherein the second and third time durations are part of the first time duration. In some cases, the first time duration may be longer than the second time duration. In some cases, the first time duration may be longer than the third time duration.

An apparatus for wireless communication is described. The apparatus may include means for predetermining a plurality of bandwidth parts to monitor based on resource reservation information received from at least one base station, and means for transmitting information indicative of the predetermined bandwidth parts in a radio resource control (RRC) message. In some cases, a base station may include means for transmiting information indicative of predetermined bandwidth parts including a monitoring schedule to monitor either the first bandwidth part or the second bandwidth part in a timeslot of a set of timeslots. In some cases, a UE may include means for receiving a predetermined monitoring schedule from a base station, and selecting a plurality of bandwidth parts to monitor on a physical downlink control channel based on the received schedule. In some examples, a UE may include means for monitoring a first bandwidth part in at least one portion of a first timeslot and means for monitoring a second bandwidth part in at least one portion of a second timeslot. In some examples, at least one base station in a second cell may include means for receiving a first resource reservation message from a first cell, the message comprising information about a plurality of slots reserved for transmission for a first time duration, the base station may include means for receiving from the first cell a second resource reservation message comprising information about a first subset of the plurality of slots reserved for transmission for a second time duration, and the base station may include means for utilizing at least one of the plurality of slots that is not in the first subset for transmission with a user equipment in the second cell. In some cases, the base station may include means for receiving from the first cell a third resource reservation message comprising information about a second subset of the plurality of slots reserved for transmission for a third time duration, and means for utilizing at least one of the plurality of slots that is not in the second subset for transmission with a user equipment in the second cell, wherein the second and third time durations are part of the first time duration. In some cases, the first time duration may be longer than the second time duration. In some cases, the first time duration may be longer than the third time duration.

Another apparatus for wireless communication is described. The apparatus may include a processor, memory in electronic communication with the processor, and instructions stored in the memory. The instructions may be operable to cause the processor to predetermine a plurality of bandwidth parts to monitor based on resource reservation information received from at least one base station, and transmit information indicative of the predetermined bandwidth parts in a radio resource control (RRC) message. In some cases, the instructions may be operable to cause the processor to transmit information indicative of predetermined bandwidth parts including a monitoring schedule to monitor either the first bandwidth part or the second bandwidth part in a timeslot of a set of timeslots. In some cases, the instructions may be operable to cause the processor to receive a predetermined monitoring schedule from a base station, and select a plurality of bandwidth parts to monitor on a physical downlink control channel based on the received schedule. In some examples, the instructions may be operable to cause the processor to monitor a first bandwidth part in at least one portion of a first timeslot and monitor a second bandwidth part in at least one portion of a second timeslot. In some examples, the instructions may be operable to cause the processor to receive a first resource reservation message from a first cell, the message comprising information about a plurality of slots reserved for transmission for a first time duration, the instructions may be operable to cause the processor to receive from the first cell a second resource reservation message comprising information about a first subset of the plurality of slots reserved for transmission for a second time duration, and the instructions may be operable to cause the processor to utilize at least one of the plurality of slots that is not in the first subset for transmission with a user equipment in the second cell. In some cases, instructions may be operable to cause the processor to receive from the first cell a third resource reservation message comprising information about a second subset of the plurality of slots reserved for transmission for a third time duration, and utilize at least one of the plurality of slots that is not in the second subset for transmission with a user equipment in the second cell, wherein the second and third time durations are part of the first time duration. In some cases, the first time duration may be longer than the second time duration. In some cases, the first time duration may be longer than the third time duration.

A non-transitory computer-readable medium for wireless communication is described. The non-transitory computer-readable medium may include instructions operable to cause a processor to predetermine a plurality of bandwidth parts to monitor based on resource reservation information received from at least one base station, and transmit information indicative of the predetermined bandwidth parts in a radio resource control (RRC) message. In some cases, the non-transitory computer-readable medium may include instructions operable to cause a processor to transmit information indicative of predetermined bandwidth parts including a monitoring schedule to monitor either the first bandwidth part or the second bandwidth part in a timeslot of a set of timeslots. In some examples, the non-transitory computer-readable medium may include instructions operable to cause a processor to receive a predetermined monitoring schedule from a base station, and select a plurality of bandwidth parts to monitor on a physical downlink control channel based on the received schedule. In some examples, the non-transitory computer-readable medium may include instructions operable to cause a processor to monitor a first bandwidth part in at least one portion of a first timeslot and monitor a second bandwidth part in at least one portion of a second timeslot. In some examples, the non-transitory computer-readable medium may include instructions operable to cause a processor in at least one base station in a second cell to receive a first resource reservation message from a first cell, the message comprising information about a plurality of slots reserved for transmission for a first time duration, the the non-transitory computer-readable medium may include instructions operable to cause a processor to receive from the first cell a second resource reservation message comprising information about a first subset of the plurality of slots reserved for transmission for a second time duration, and the the non-transitory computer-readable medium may include instructions operable to cause a processor to utilize at least one of the plurality of slots that is not in the first subset for transmission with a user equipment in the second cell. In some cases, the non-transitory computer-readable medium may include instructions operable to cause a processor from the first cell to utilize a third resource reservation message comprising information about a second subset of the plurality of slots reserved for transmission for a third time duration, and may cause a processor to utilize at least one of the plurality of slots that is not in the second subset for transmission with a user equipment in the second cell, wherein the second and third time durations are part of the first time duration. In some cases, the first time duration may be longer than the second time duration. In some cases, the first time duration may be longer than the third time duration.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Power is an important resource in communication systems, and optimizing its use is vital. A UE may conserve power by entering a power saving "deep sleep" mode when not engaging in active communications. A UE may monitor a downlink at a reduced rate, for instance on a discontinuous receive (DRX) cycle. Thus, a UE may wake up every so often to monitor paging and may do so on a relatively narrow bandwidth. However, once a UE receives a paging indication, it might monitor the downlink on an entire bandwidth and still expend unneccesary power.

Therefore, there is a need for dynamic downlink monitoring to optimize UE power use. To optimally conserve power, a UE may dynamically change its monitoring bandwidth on the downlink and monitor smaller bandwidths when feasable.

For instance, a UE may receive a predetermined monitoring schedule from a base station, and may select a plurality of bandwidth parts to monitor on a physical donwlink control channel based on the received predetermined schedule. There is a further need for such systems in dynamic spectrum reuse scenarios as discussed below.

Aspects of the disclosure are initially described in the context of a wireless communications system. Aspects of the disclosure are further illustrated by a process flow. Aspects of the disclosure are further illustrated by and described with reference to apparatus diagrams, system diagrams, and flowcharts that relate to modulation table determination and CQI reporting.

Figure 1:
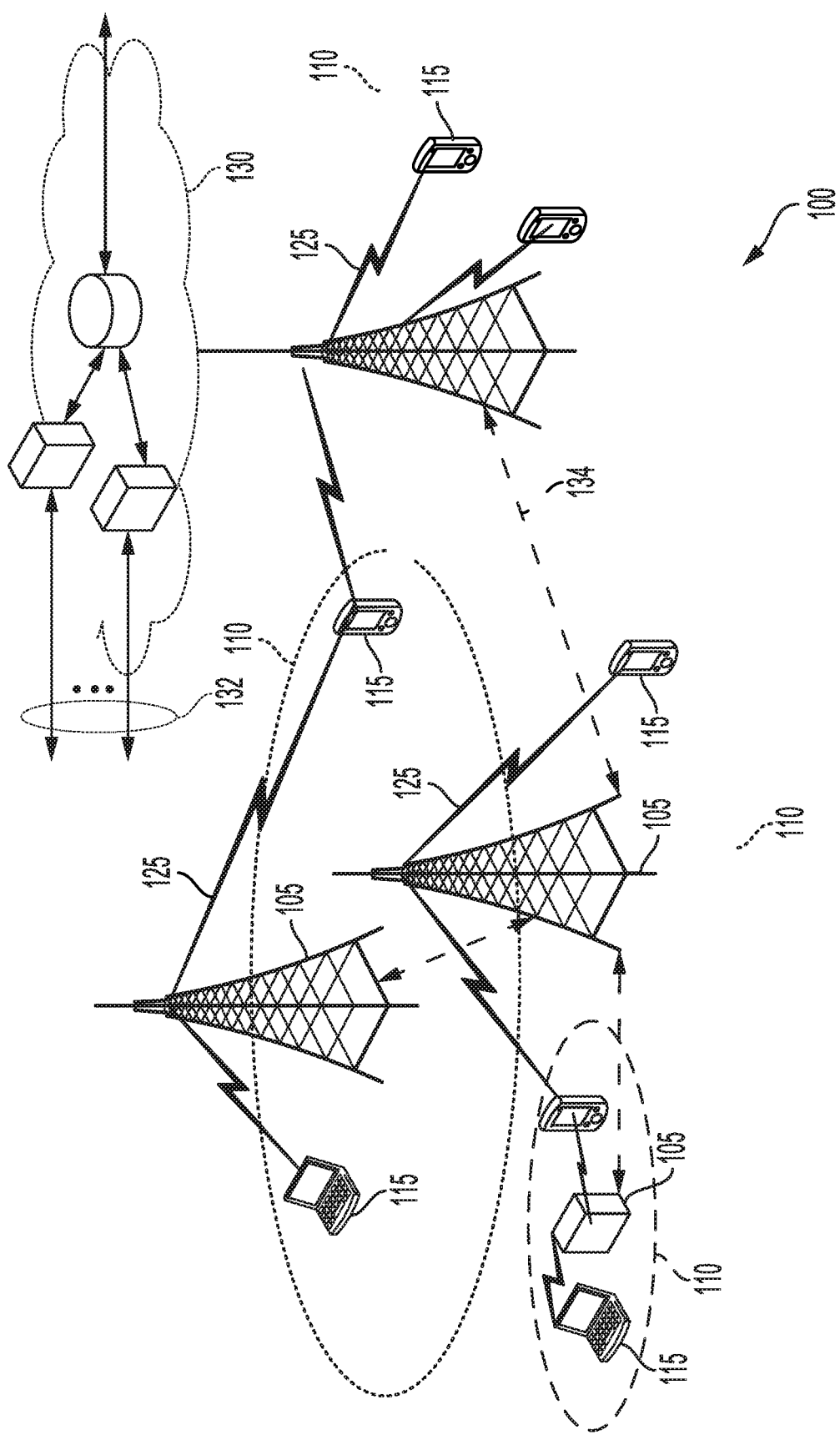
FIGS. 1 and 2 illustrate an example wireless communication system that supports dynamic downlink monitoring techniques in accordance with aspects of the present disclosure.

FIG. 1 illustrates an example of a system 100 for wireless communications in accordance with various aspects of the present disclosure. The system 100 includes base stations 105, UEs 115, and a core network 130. In some examples, the system 100 may be a Long Term Evolution (LTE) network, an LTE-Advanced (LTE-A) network, an LTE-A Pro network, or a New Radio (NR) network which may also be referred to as a 5G network. In some cases, the system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a 5G Node B, a New Radio (NR) BS, a Home NodeB, a Home eNodeB, or some other suitable terminology. The system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, communication links 125 between a base station 105 and a UE 115 may utilize one or more carriers. Communication links 125 shown in the system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

A geographic coverage area 110 for a base station 105 may be divided into sectors making up only a portion of the geographic coverage area 110. Each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110.

In some examples, different geographic coverage areas 110 associated with different technologies may overlap, and overlapping geographic coverage areas 110 associated with different technologies may be supported by the same base station 105 or by different base stations 105. The system 100 may include, for example, a heterogeneous LTE/LTE-A/ LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention.

In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. In some cases, UEs 115 may be designed to support critical functions (e.g., mission critical functions), and the system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 132 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW).

The MME may manage non-access stratum (NAS) (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

The system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

The system 100 may also operate in a super high frequency (SHF) region using frequency bands from 3 GHz to 30 GHz, also known as the centimeter band. The SHF region includes bands such as the 5 GHz multiple industrial, scientific, and medical (ISM) bands, which may be used opportunistically by devices that can tolerate interference from other users. The system 100 may also operate in an extremely high frequency (EHF) region of the spectrum (e.g., from 30 GHz to 300 GHz), also known as the millimeter band. In some examples, the system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115.

However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, the system 100 may utilize both licensed and unlicensed radio frequency spectrum bands. For example, the system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, the system 100 may use a transmission scheme between a transmitting device (e.g., a base station 105) and a receiving device (e.g., a UE 115), where the transmitting device is equipped with multiple antennas and the receiving devices are equipped with one or more antennas.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Devices of the system 100 (e.g., base stations 105 or UEs 115) may have a hardware configuration that supports communications over a particular carrier bandwidth, or may be configurable to support communications over one of a set of carrier bandwidths. In some examples, the system 100 may include base stations 105 and/or UEs that can support simultaneous communications via carriers associated with more than one different carrier bandwidth. The system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

Wireless communications systems such as an NR system may utilize any combination of licensed, shared, and unlicensed spectrum bands, among others. In some examples, NR shared spectrum may increase spectrum utilization and spectral efficiency, specifically through dynamic vertical (e.g., across frequency) and horizontal (e.g., across time) sharing of resources.

Figure 2:
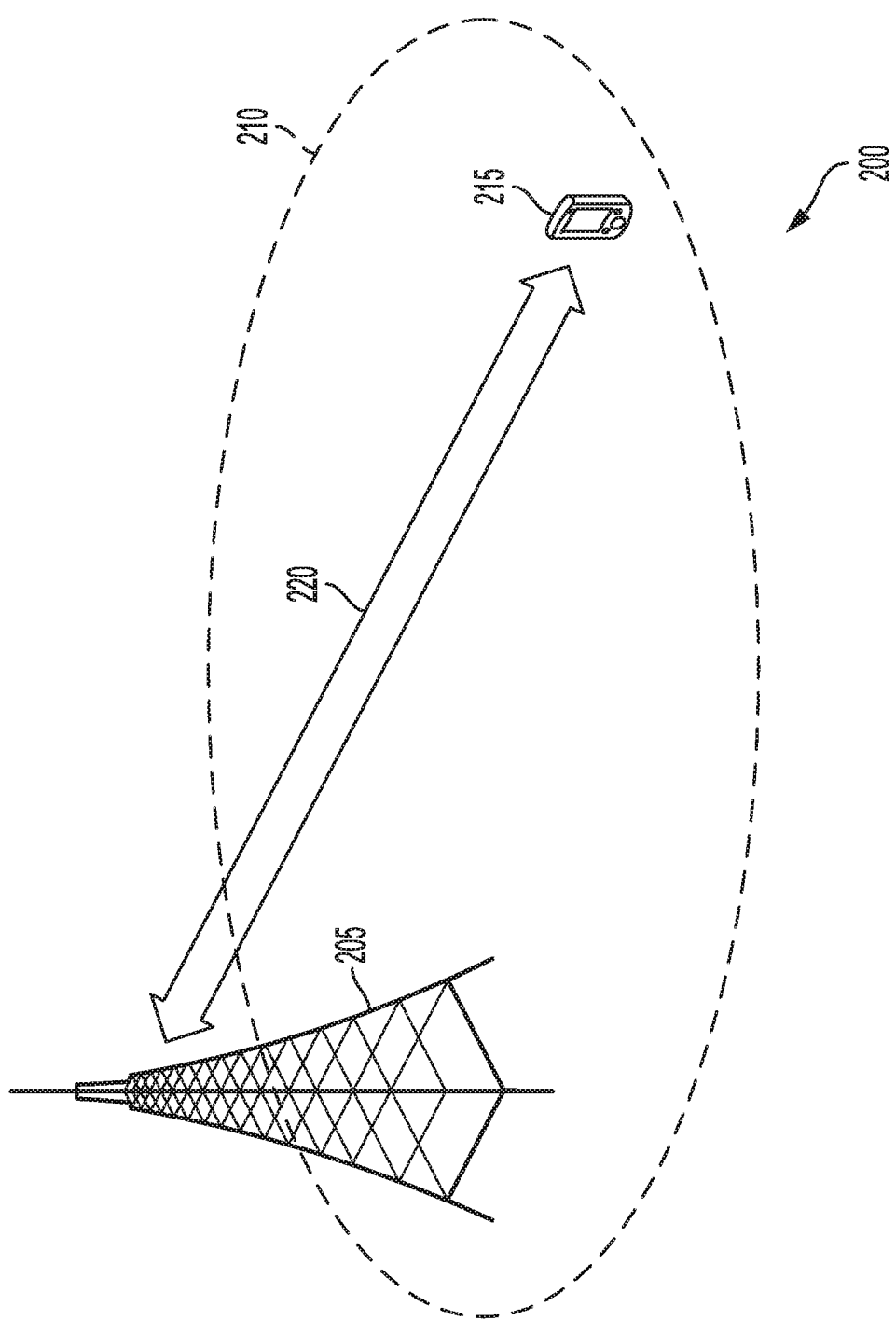

FIG. 2 illustrates an example wireless communication system that supports dynamic downlink monitoring techniques in accordance with aspects of the present disclosure. In some examples, the system 200 may implement aspects of the system 100. The system 200 may include a base station 205 and a UE 215, which may be examples of the corresponding devices described with reference to FIG. 1. In the example of FIG. 2, the system 200 may operate according to a radio access technology (RAT) such as a fourth generation (4G) LTE or LTE-A, 5G or NR, although techniques described herein may be applied to any RAT and to systems that may concurrently use two or more different RATs.

The base station 205 and the UE 215 may establish a bidirectional link 220 by performing a radio resource control (RRC) procedure which may include a cell acquisition procedure, a random access channel (RACH) procedure, an RRC connection procedure, and an RRC configuration procedure. Re-configuration procedures may also occur between UE 215 and base station 205 as required.

The base station 205 may transmit a message including control information to the UE 215 via bidirectional link 220. In an example, the message may be an RRC message, which may be communicated to the UE 215 via RRC signaling.

In an aspect of present examples, the base station 205 may transmit downlink information on a physical downlink control channel (PDCCH) or a sPDCCH.

To enable efficient system access, meet power savings requirements, and provide mobility optimization, an RRC procedure may be correlated to a specific state or mode.

For instance, an RRC procedure may include an RRC idle mode, an RRC inactive mode, and an RRC connected mode of operation. A UE 215 may be in RRC idle/disconnected mode when it powers up. UE 215 may enter an RRC connected state with initial attach or connection establishment. If there is no activity for a period of time, it may suspend its session by moving to an RRC inactive state. A UE 215 may then resume its session and move into RRC connected mode.

In some examples, RRC idle mode of operation may include public land mobile network (PLMN) selection, broadcast of system information, cell re-selection mobility, paging for mobile terminated data initiated by a 5G core network, paging for mobile terminated data area managed by 5G core network, discontinued receive (DRX) for core network paging confiugred by non-access stratum (NAS), etc.

In examples, RRC inactive mode of operation may include broadcast of system information, cell re-selection mobility, paging initiated by new core radio acces network NG-RAN (RAN paging), RAN-based notification area (RNA) managed by NG-RAN, DRX for RAN paging configured by NG-RAN, 5G core network—NG-RAN connection (both control/user or C/U-planes) established for UE, UE access stratum (AS) context stored in NG-RAN and the UE, NG-RAN knows the radio network access which the UE belongs to, etc In examples, RRC connected mode of operation may include 5GC—NG-RAN connection (both C/U-planes) established for UE, UE AS context stored in NG-RAN and the UE, NG-RAN knows the cell which the UE belongs to, transfer of unicast data to/from the UE, network controlled mobility including measurements, etc Enabling efficient RRC protocols provides optimized system access, power savings and enhanced mobility to provide support for eMBB, Ultra-Reliable Low-Latency Communication (URLLC), and Massive internet of things (IoT) services at efficient energy dissipation levels and reasonable cost.

Enhanced Mobile Broadband (eMBB) UEs support services that require high bandwidth such as high definition video and virtual reality applications, and transmission of small packets at high data rates. Massive machine type communications (mMTC) enable services that include high requirements for connection density such as smart city and smart agriculture. URLLC is a mode of Machine-Type Communication (MTC) enabling services requiring transmission of small packets at ultra low latency and high reliability. Latency may refer to the delay of transmitted packets. Dropped packets, or packets decoded in error may be said to have infinite latency. Reliability may refer to a probability that latency does not exceed a certain value. URLLC may be used for mission critical communications including coordination among vehicles, assisted or automated driving, reliable remote management e.g. of robots, etc.

Due to stringent reliability and latency requirements, a set of resources may be reserved for URLLC traffic. These may include time or frequency resources. URLLC traffic has certain synchronous and periodic patterns and may follow a specific spectrum reuse pattern. Thus, resources (e.g., time or frequency) allocated for URLLC communication may be reused in a regular pattern of cells (where each cell is covered by a gNB or base station 205). Cells are assigned resources such that geographically proximate gNBs or base stations use different resources (e.g., frequency sub-bands) for communication. This reduces inter-cell interference between adjacent base stations.

Figure 3:
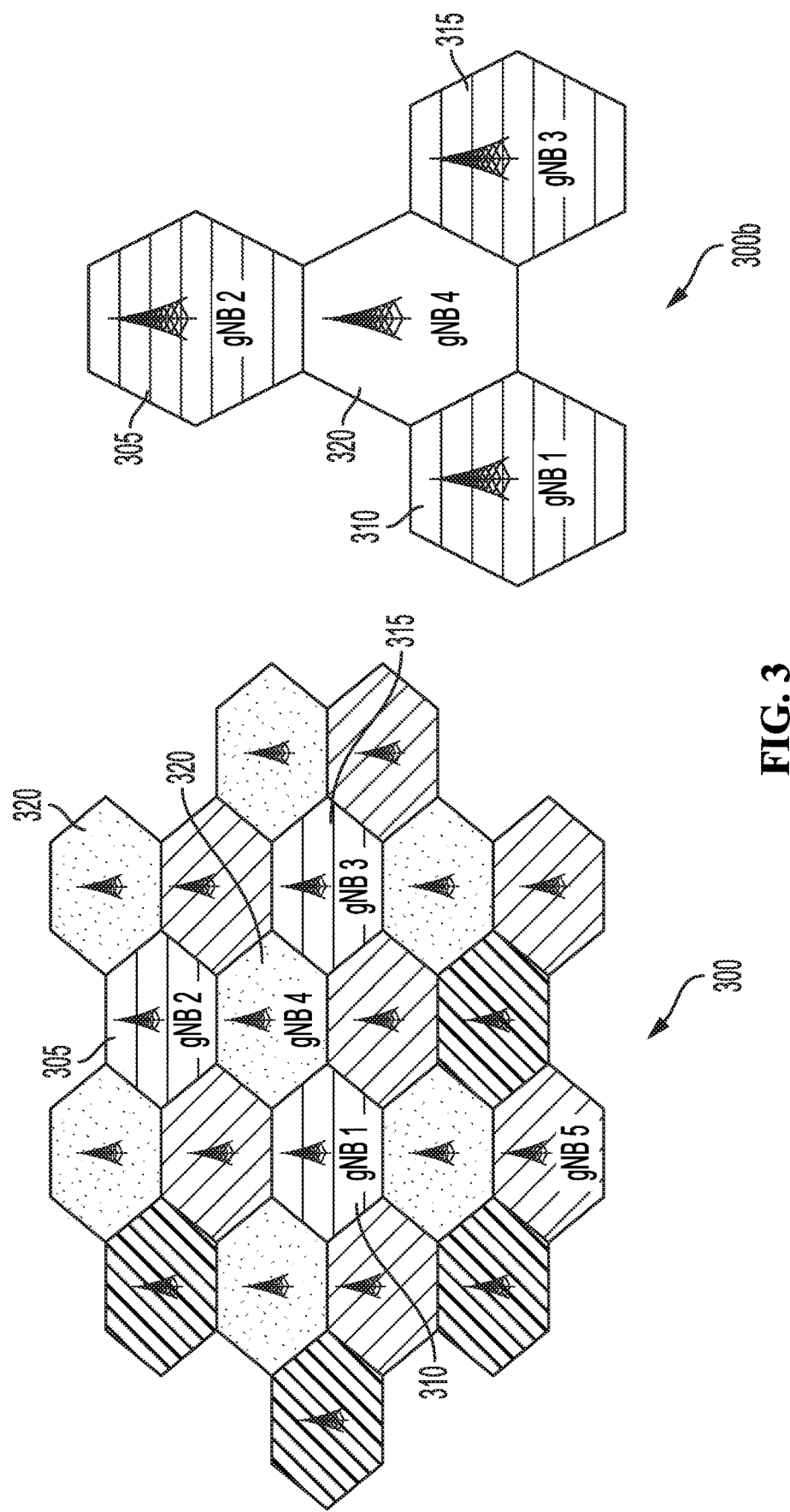
FIG. 3 illustrates an example of cells in a communication network with a reuse factor in accordance with aspects of the present disclosure.

FIG. 3 illustrates an example of cells in a communication network 300 with a reuse factor of 3 in accordance with disclosed examples. Here, a reuse factor of 3 refers to the partitioning into three bands, of a frequency band assigned to cells in communication network 300. Each sub-band is depicted by different hatching as illustrated. Base stations or gNBs assigned to each cell use resources assigned to that particular cell. Thus gNB1, gNB2 and gNB3 use a first sub-band, gNB4 uses a second sub-band and gNB5 uses a third sub-band.

Further illustration is provided in 300*b*. Here, a first frequency sub-band is assigned to a first plurality of cells 310, 305 and 315. Thus, gNB1, gNB2 and gNB3 use this first frequency sub-band for communication. A second frequency sub-band is assigned to a second plurality of cells (for illustration, only cell 320 is shown). Thus, gNB4 in cell 320 uses a second frequency sub-band for communication.

In some examples, at reuse 1, all base stations in a communication network 300 may communicate using the same band. In some examples, different reuse factors such as reuse 4, resuse 5, etc may be assigned. However, as a reuse factor increases, bandwidth allocated to each base station decreases.

In an aspect of disclosed examples, a base station 205 or network controller may determine a reuse factor for a communication system.

Figure 4:
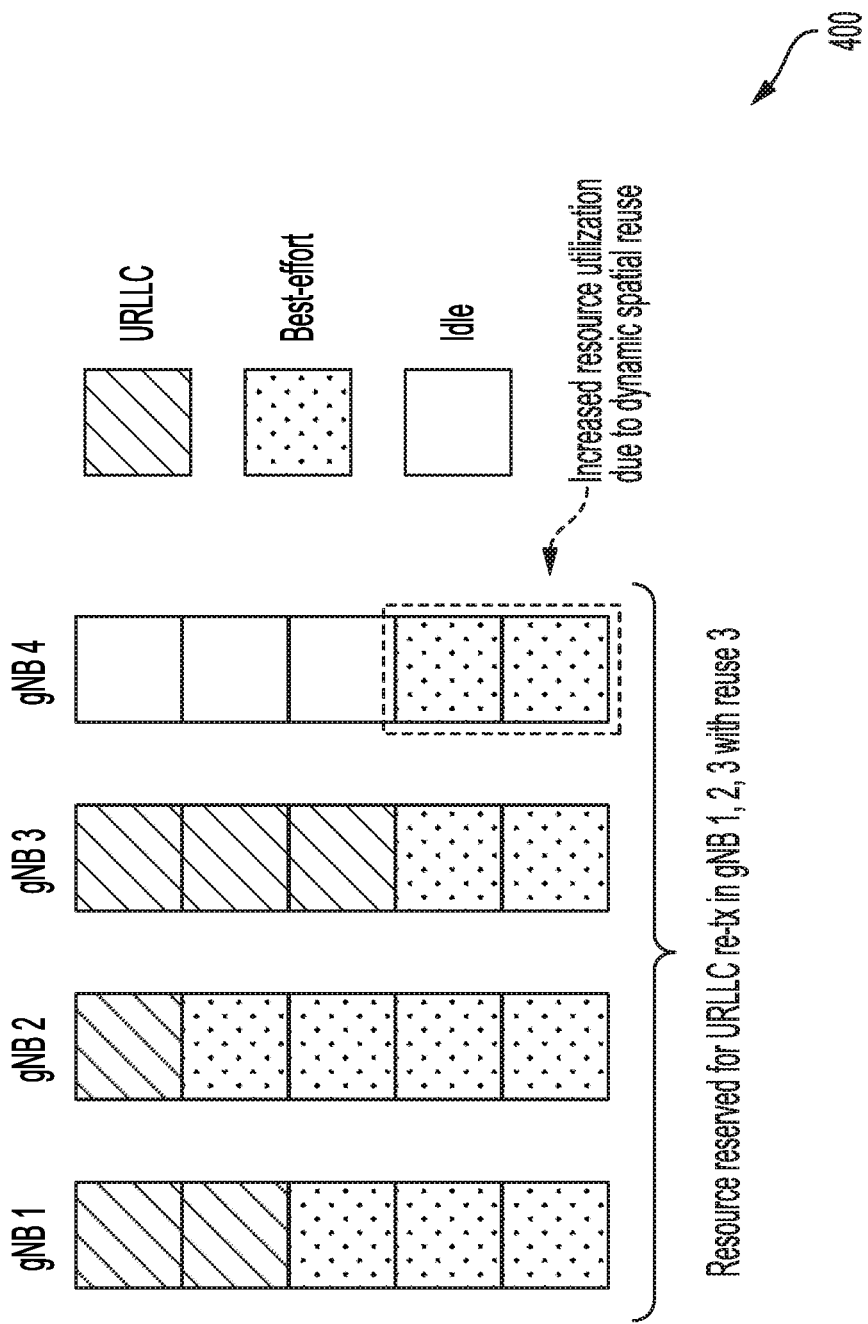
FIG. 4 illustrates an example of reserved resource use assignment in accordance with aspects of the present disclosure.

FIG. 4 illustrates an example of reserved resource use assignment in accordance with disclosed examples. Due to the nature of URLLC traffic, and its intended use, some URLLC resources may be reserved for retransmissions if necessitated. Therefore, a part of available resources may be designated for first transmissions of URLLC traffic and remaining resources may be reserved for retransmission of URLLC traffic.

As illustrated in FIG. 4, each base station (or gNB1, gNB2, gNB3, gNB4) in a communication system following a spectrum reuse pattern of 3 may be assigned five partitioned resources for URLLC retransmission. As used herein, reserved resources may refer to time or frequency resources. However, other communication resources may be reserved. In some examples, the amount of URLLC resources allocated for retransmissions may be dimensioned according to a worst-case scenario for retransmissions. This could lead to underutilization of retransmission resources by URLLC.

In some examples, unused URLLC reserved resources may be dynamically allocated for best-effort traffic in neighboring base stations with reuse 1. This means that if a resource reserved for URLLC use is indeed used by the initial transmission or retransmission of URLLC traffic, then the same time frequency resource is not spatially reused by the immediately neighboring base stations so as to reduce inter-cell interference and increase the reliability. However, if the resource is not actually used by URLLC traffic, for example, because the needs of URLLC traffic do not occur, then the same time frequency resource can be spatially reused by the immediately neighboring base stations, presumably for their best-effort traffic so as to increase the overall system resource efficiency.

In the example of FIG. 4, base stations gNB1-gNB4 are associated with respective frequency sub-bands, e.g. corresponding to illustrative sub-bands of FIG. 3. Thus, gNB1, gNB2 and gNB3 may be assigned a first frequency sub-band (cells with horizontal hatching in FIG. 3b), and gNB4 may be assigned a second frequency sub-band (cells with no fill in FIG. 3b) for communication.

As illustrated, each of gNB1, gNB2 and gNB3 has five reserved resources assigned for URLLC retransmission. The reservation of five resource units may be dimensioned for needs in a worst case scenario. However, it may be determined that in a given slot, only two retransmissions are needed in gNB1, which is considered better than the worst case. Therefore, three reserved resources may no longer be required for URLLC traffic. Thus, these three resources may be used for best-effort (e.g. eMBB) traffic in gNB1. A second base station, gNB2, may require one reserved resource assigned for URLLC retransmissions and may release four reserved resources for best-effort traffic. A third base station, gNB3, may require three reserved resources assigned for URLLC retransmission and may release two reserved resources for best-effort traffic. Thus, at a particular instance of example 400, gNB1 has two users it needs to retransmit URLLC traffic to, gNB2 has one user to retransmit to and gNB3 has three users it needs to retransmit to. At this instance, gNB1, gNB2 and gNB3 would require at most three retransmission slots for URLLC traffic retransmissions.

Thus, gNB4 may appropriate unused retransmission resources assigned to gNB1-gNB3 to transmit its best-effort traffic. In other words, gNB4 may determine to use the two remaining reserved resources (bottom two slots) not used in any of gNB1, gNB2 and gNB3 for URLLC traffic to transmit its best effort traffic.

In some examples, base stations gNB1-gNB3 may transmit a predetermined monitoring pattern to base station gNB4. A well defined predetermined monitoring pattern allows a base station (e.g. gNB4) to optimize downlink monitoring. This provides UE power savings. Whereas, a UE associated with gNB4 may determine whether or not to monitor an entire bandwidth based on previous monitoring results, it may simply base its monitoring on a given predetermined schedule. That is, a UE does not itself need to expend resources trying to determine what portions of the bandwidth to monitor, or inefficiently monitor bandwidths that are unnecessarily too large. A UE may follow a monitoring schedule it receives from a base station. This is illustrated in FIG. 5.

Figure 5:
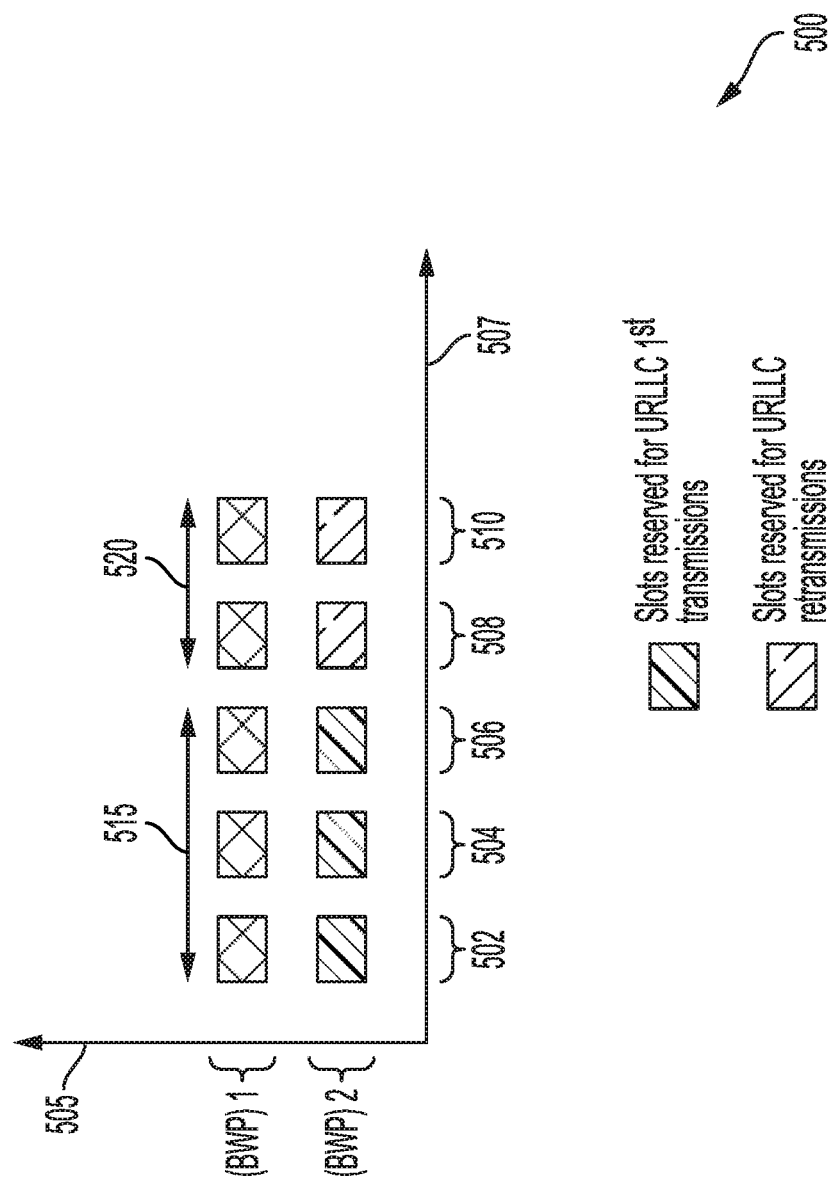
FIG. 5 illustrates an example of a resource reservation pattern that supports dynamic downlink monitoring techniques for communications systems in accordance with aspects of the present disclosure.

FIG. 5 shows an exemplary resource reservation pattern in accordance with various aspects of disclosed examples. As illustrated, x-axis 507 represents time and y-axis 505 represents frequency or bandwidth part (BWP). BWP may refer to a contiguous set of physical resource blocks selected from a contiguous subset of the common resource blocks for a given numerology on a given carrier. In FIG. 5, y-axis 505 includes BWP1 and BW2. In other examples, the y-axis 505 may represent any plurality of bandwidth parts. BWP1 is associated with common cells and BWP2 is associated with common cells that are different from cells associated with BWP1. For instance, in FIG. 5, BWP1 is associated with cell 320 of FIG. 3 and BWP2 is associated with cells 305, 310 and 315 of FIG. 3.

For purposes of illustration, the x-axis 507 in FIG. 5 is partitioned into five transmission slots 502, 504, 506, 508 and 510. In other examples, the x-axis may be partitioned into any plurality of transmission slots. Each partition is associated with first transmissions and retransmissions of URLLC resources. In some examples, these partitions may be known beforehand. In FIG. 5, transmission slots 502, 504 and 506 associated with BWP2 are reserved for URLLC first transmissions. Transmission slots 508 and 510 associated with BWP2 are reserved for URLLC retransmissions. In other examples, transmission slots 502, 504 and 506 associated with BWP2 may be reserved for a first type of URLLC traffic and transmission slots 508 and 510 associated with BWP2 may be reserved for a second type of URLLC. The first type of URLLC traffic may be periodic while the second type of URLLC traffic may be bursty in the sense that the traffic needs are highly time varying.

In the example of FIG. 5, base stations gNB1-gNB3 (associated with BWP2) may communicate a predetermined monitoring pattern to base station gNB4 (associated with BWP1). Here, gNB1-gNB3 may inform gNB4 that slots 502-506 are reserved for URLLC first transmissions and slots 508-510 are reserved for URLLC retransmissions. Thus, if retransmission slots 508 and 510 are unused by URLLC UEs (e.g. UEs 215) associated with gNB1-gNB3 in cells 305, 310 and 315 of FIG. 3, then gNB1-gNB3 will inform gNB4 so that gNB4 may schedule its eMBB UEs to use these slots for best-effort traffic. In other words, in transmission slots 508 and 510, or for time 520, gNB4 UEs may monitor BWP1 as well as BWP2. If it is determined transmission slots 508 and 510 associated with BWP2 become available (i.e., are unused), then gNB4 UEs may use these slots for transmission of best-effort traffic.

Here, gNB4 opportunistically uses physical resource blocks associated with a different BWP for its eMBB traffic. As illustrated by exemplary FIG. 5, UE power is conserved by gNB4 following a predetermined schedule to use a narrowband or wideband Rx module to monitor PDCCH.

In some examples, a predetermined schedule for reserved resources may be allocated during an RRC protocol such as during RRC connected mode.

Figure 6:
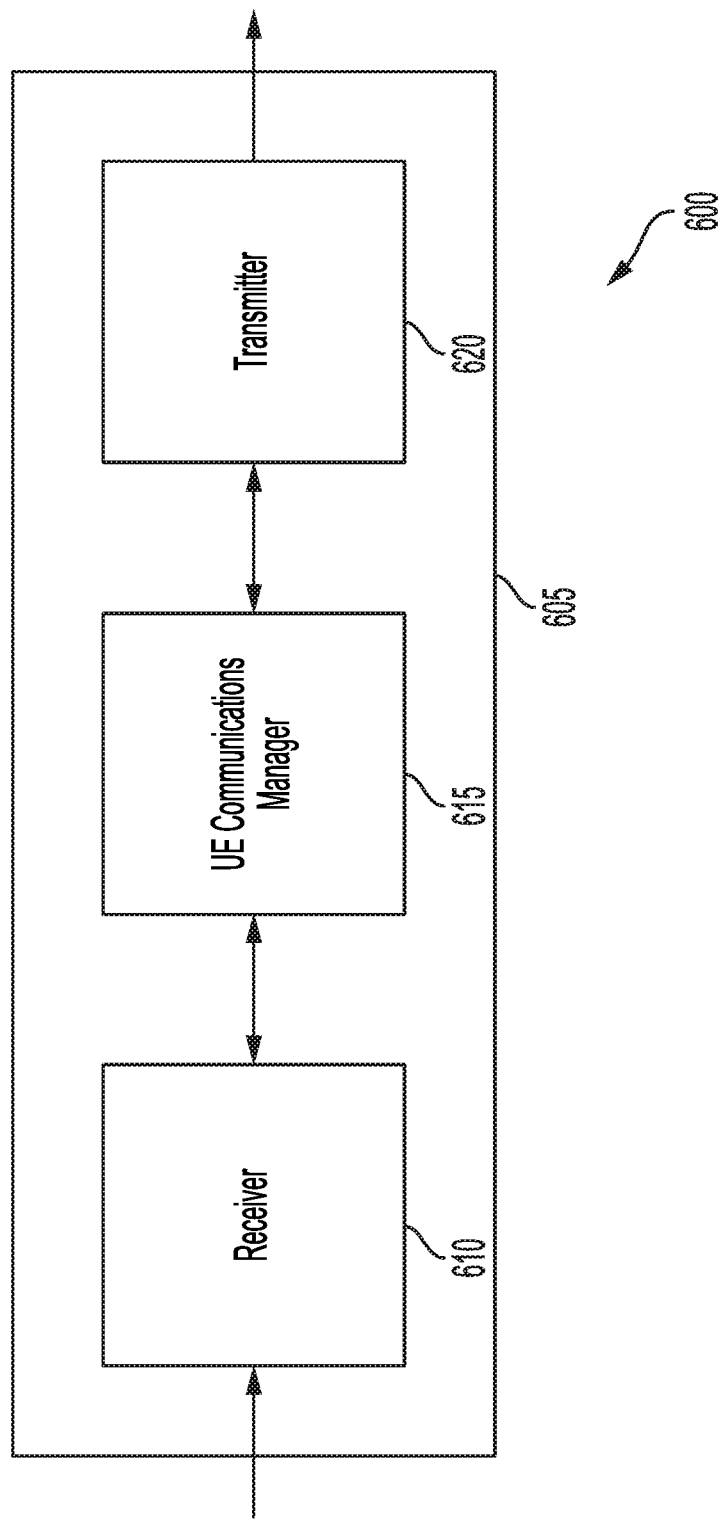
FIG. 6 illustrates a block diagram of a system including a UE that supports dynamic downlink monitoring techniques for communications systems in accordance with aspects of the present disclosure.

FIG. 6 illustrates an example block diagram that supports dynamic downlink monitoring techniques for communications systems in accordance with aspects of the present disclosure. Wireless device 605 may be an example of aspects of a user equipment (UE) 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and scheduling information related to bandwidth parts to monitor, etc.) Information may be passed on to other components of the device. The receiver 610 may be an example of aspects of the transceiver 835 described with reference to FIG. 8. The receiver 610 may utilize a single antenna or a set of antennas.

UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may receive a predetermined monitoring schedule from a base station 205. UE communications manager 615 may select a plurality of bandwidth parts to monitor on a PDCCH based on the received predetermined schedule.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
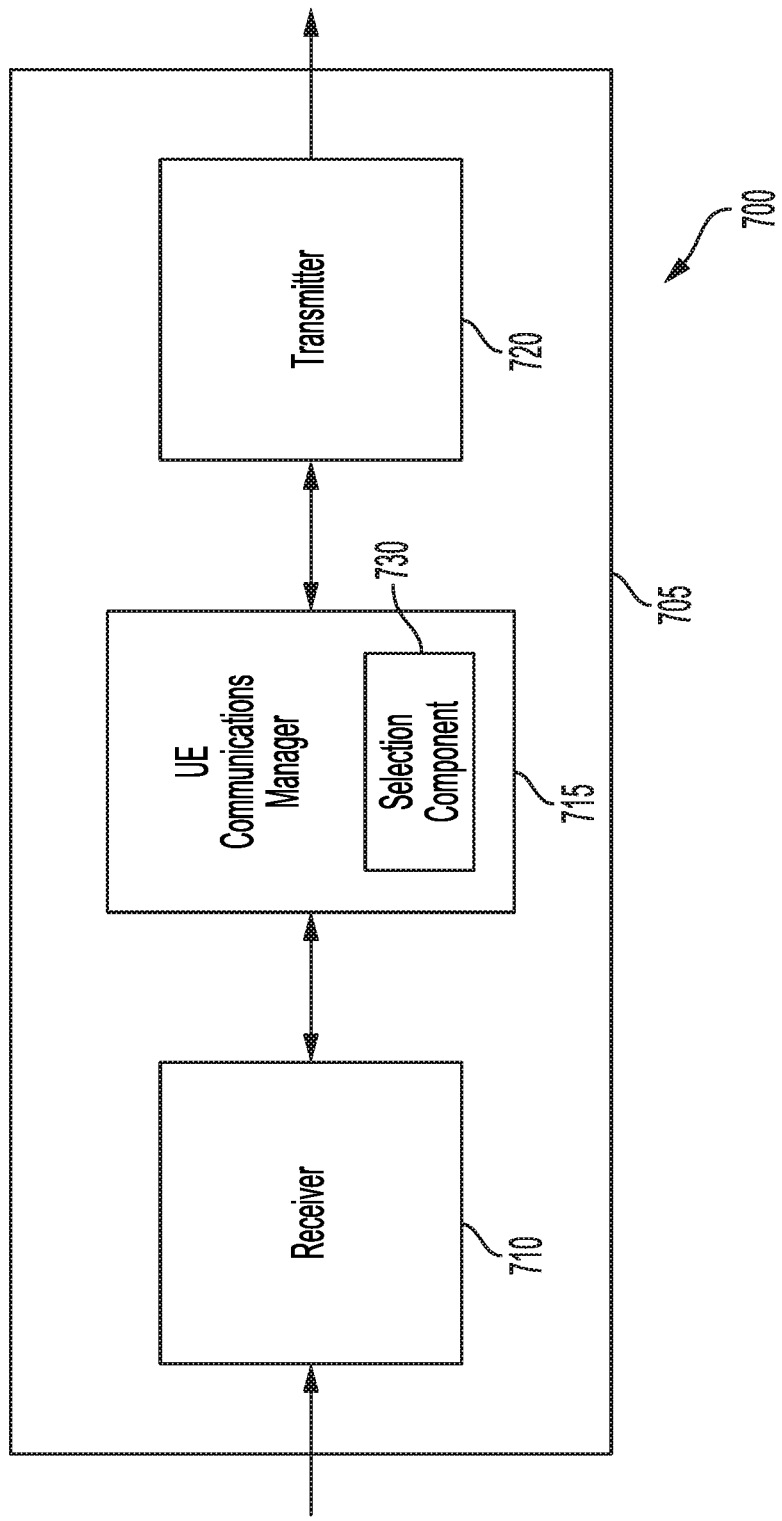
FIG. 7 illustrates a block diagram of a system including a UE that supports dynamic downlink monitoring techniques for communications systems in accordance with aspects of the present disclosure.

FIG. 7 shows a block diagram 700 of a wireless device 705 that supports dynamic downlink monitoring techniques for communications systems in accordance with aspects of the present disclosure. Wireless device 705 may be an example of aspects of a wireless device UE 115 or 605 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and scheduling information related to monitoring bandwidth parts, etc.) Information may be passed on to other components of the device. The receiver 710 may be an example of aspects of the transceiver 835 described with reference to FIG. 8. The receiver 710 may utilize a single antenna or a set of antennas.

UE communications manager 715 may be an example of aspects of the UE communications manager 615 described with reference to FIG. 6. UE communications manager 715 may also include selection component 730.

Selection component 730 may select a plurality of bandwidth parts to monitor on a PDCCH based on a received predetermined schedule.

Transmitter 720 may transmit signals generated by other components of the device. In some examples, the transmitter 720 may be collocated with a receiver 710 in a transceiver module. For example, the transmitter 720 may be an example of aspects of the transceiver 835 described with reference to FIG. 8. The transmitter 720 may utilize a single antenna or a set of antennas.

Figure 8:
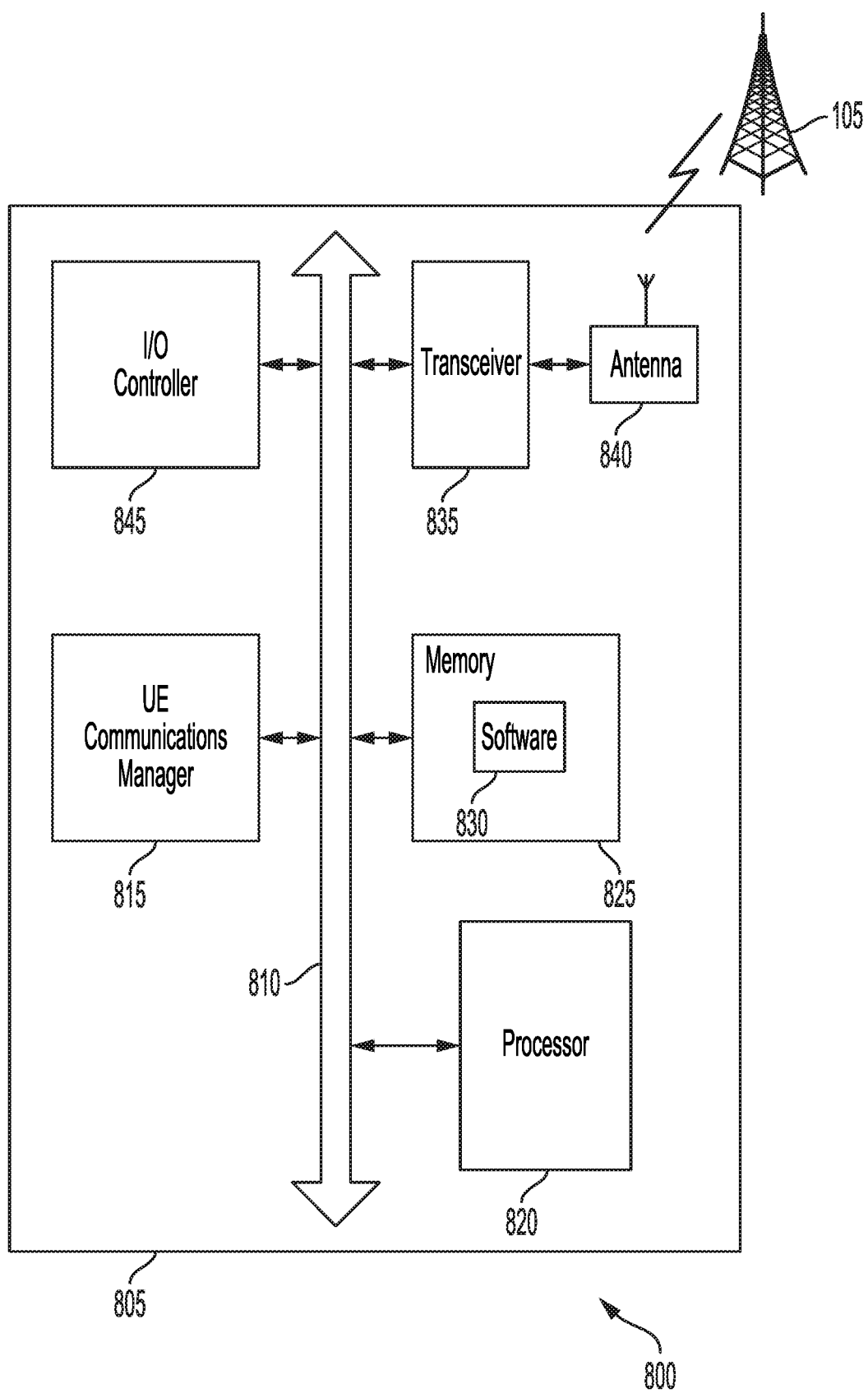
FIG. 8 illustrates a block diagram of a system including a UE and a base station that supports dynamic downlink monitoring techniques for communications systems in accordance with aspects of the present disclosure.

FIG. 8 shows a diagram of a system 800 including a device 805 that supports dynamic downlink monitoring techniques for communications systems in accordance with aspects of the present disclosure. Device 805 may be an example of or include the components of wireless device 605, wireless device 705, or a UE 115 as described above, e.g., with reference to FIGS. 6 and 7. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 820. Processor 820 may be configured to execute computer-readable instructions stored in a memory to perform various functions (e.g., functions or tasks supporting network aided power saving techniques).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support dynamic downlink monitoring. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas. In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
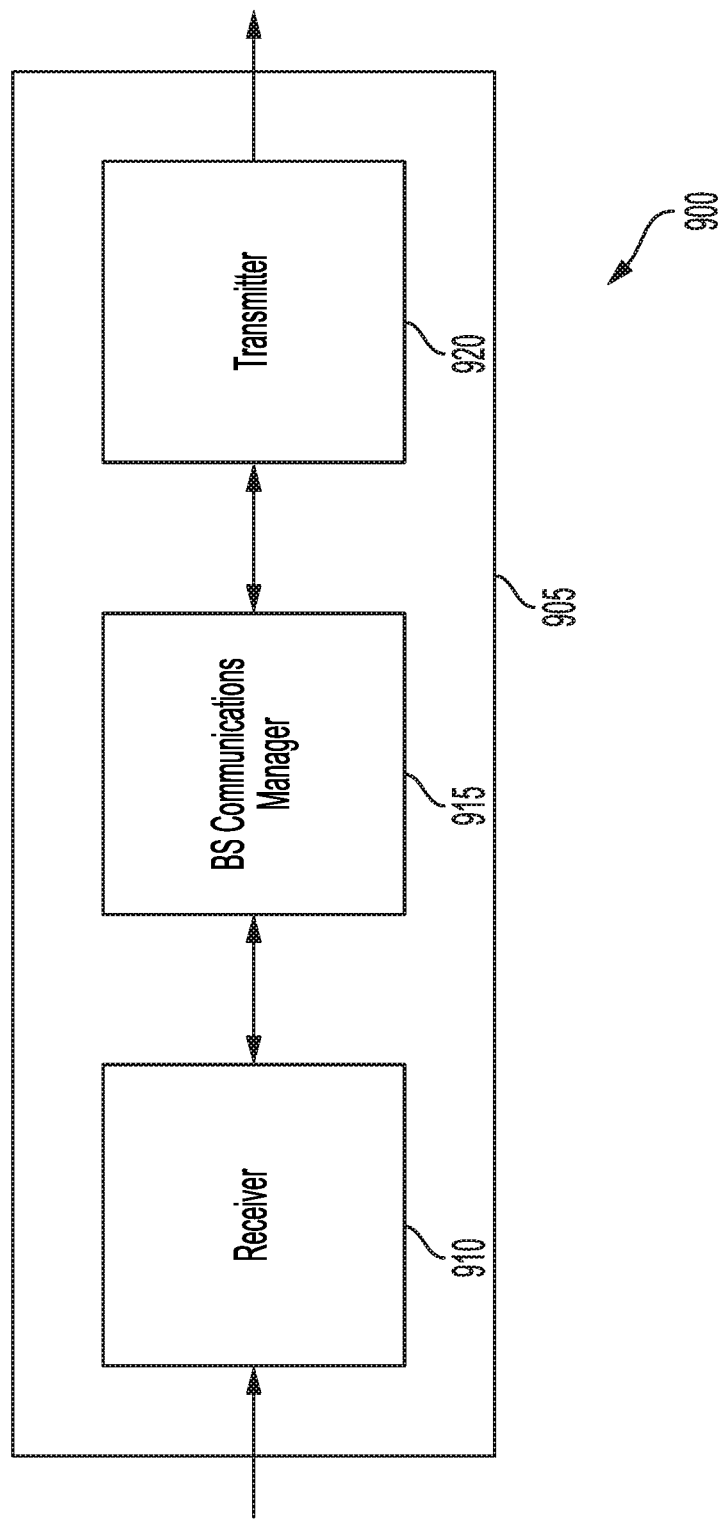
FIG. 9 illustrates a block diagram of a system including a base station that supports dynamic downlink monitoring techniques for communications systems in accordance with aspects of the present disclosure.

FIG. 9 shows a block diagram 900 of a wireless device 905 that supports dynamic downlink monitoring techniques for communications systems in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, throughput indicators, or control information associated with various information channels (e.g., control channels, data channels, and information related to bandwidth parts to monitor etc.) Information may be passed on to other components of the device. The receiver 910 may be an example of aspects of the transceiver 1135 described with reference to FIG. 11. The receiver 910 may utilize a single antenna or a set of antennas.

Receiver 910 may receive a plurality of bandwidth parts to monitor based on resource reservation information received from at least one base station.

Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may determine a predetermined plurality of bandwidth parts to monitor based on resource reservation information received from at least one other base station. Base station communications manager 915 may determine a resource reservation pattern.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas. Transmitter 920 may transmit information indicative of the predetermined bandwidth parts in a radio resouce control message.

Figure 10:
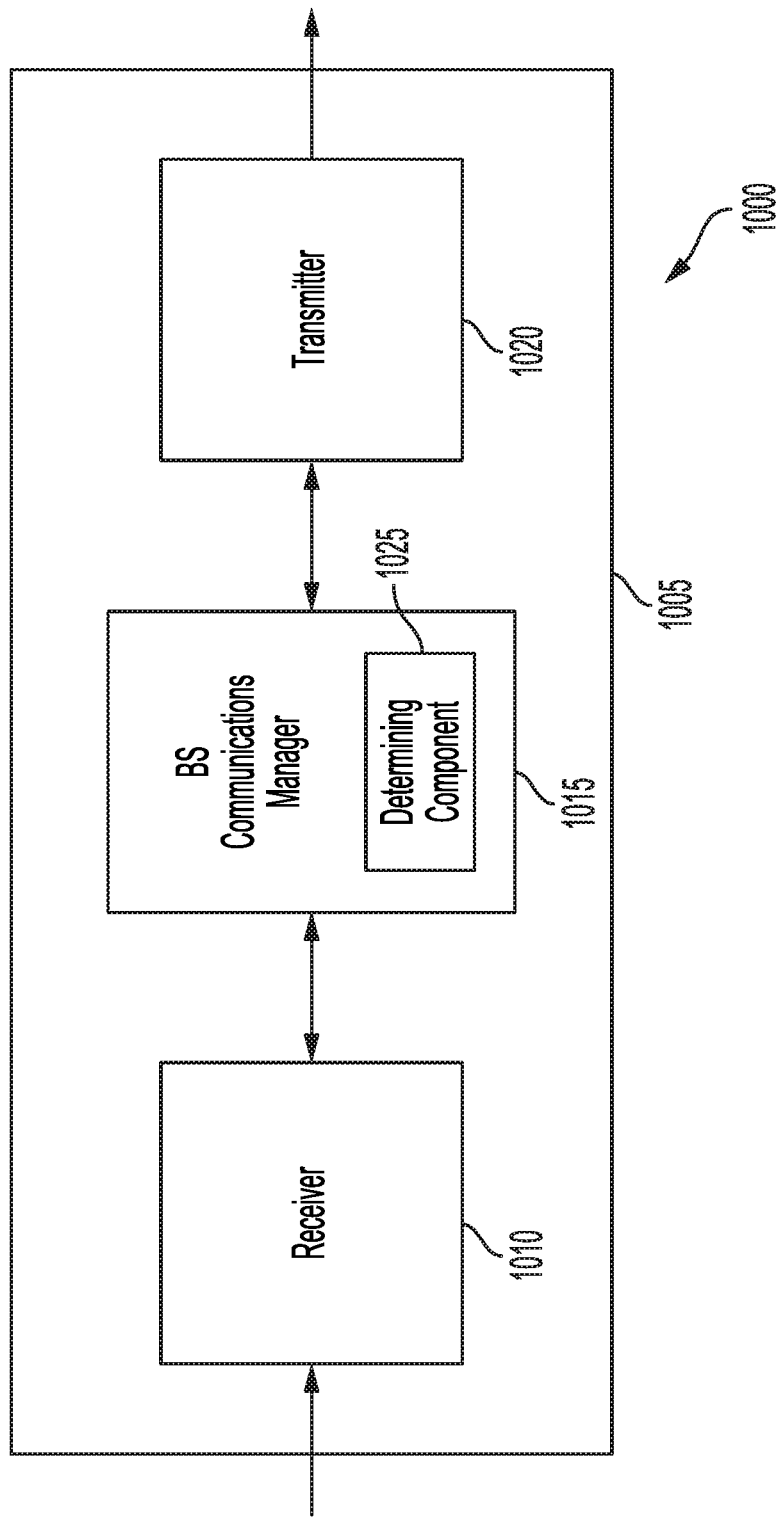
FIG. 10 illustrates a block diagram of a system including a base station that supports dynamic downlink monitoring techniques for communications systems in accordance with aspects of the present disclosure.

FIG. 10 shows a block diagram 1000 of a wireless device 1005 that supports dynamic downlink monitoring techniques for communications systems in accordance with aspects of the present disclosure. Wireless device 1005 may be an example of aspects of a wireless device base station 105 as described with reference to FIG. 1. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels, or information from at least one other base station indicating a plurality of bandwidth parts to monitor based on resource reservation information. Information may be passed on to other components of the device. The receiver 1010 may utilize a single antenna or a set of antennas.

BS communications manager 1015 and/or at least some of its various sub-components may be implemented in hardware, software executed by a processor, firmware, or any combination thereof. If implemented in software executed by a processor, the functions of the BS communications manager 1015 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The BS communications manager 1015 and/or at least some of its various sub-components may be physically located at various positions, including being distributed such that portions of functions are implemented at different physical locations by one or more physical devices. In some examples, BS communications manager 1015 and/or at least some of its various sub-components may be a separate and distinct component in accordance with various aspects of the present disclosure. In other examples, BS communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

BS communications manager 1015 may have a determining component 1025 that may predetermine a plurality of bandwidth parts to monitor based on resource reservation information received from at least one other base station.

Transmitter 1020 may transmit signals generated by other components of the device. In some examples, the transmitter 1020 may be collocated with a receiver 1010 in a transceiver module. The transmitter 1020 may utilize a single antenna or a set of antennas. Transmitter 1020 may transmit information indicative of predetermined bandwidth parts in a radio resource control message.

Figure 11:
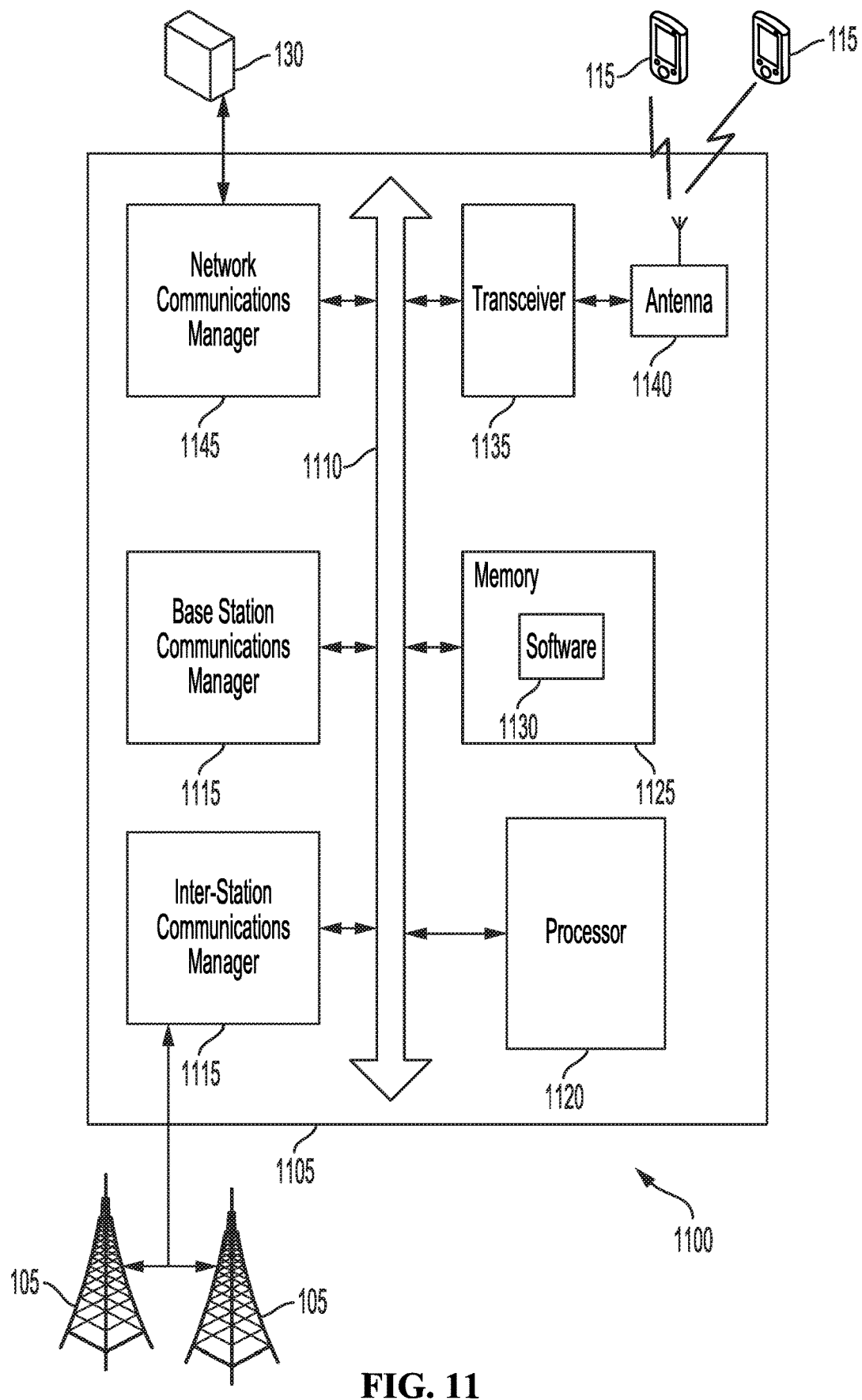
FIG. 11 illustrates a block diagram of a system including a base station that supports dynamic downlink monitoring techniques for communications systems in accordance with aspects of the present disclosure.

FIG. 11 shows a diagram of a system 1100 including a device 1105 that supports dynamic downlink monitoring techniques in accordance with aspects of the present disclosure. Device 1105 may be an example of or include the components of base station 105 as described above, e.g., with reference to FIG. 1. Device 1105 may include components for bi-directional voice and data communications including components for transmitting and receiving communications, including base station communications manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting modulation table determination and CQI reporting).

Memory 1125 may include RAM and ROM. The memory 1125 may store computer-readable, computer-executable software 1030 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support dynamic downlink monitoring. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas. In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base stations 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1150 may provide an X2 interface within an LTE/LTE-A wireless communication network technology to provide communication between base stations 105.

Figure 12:
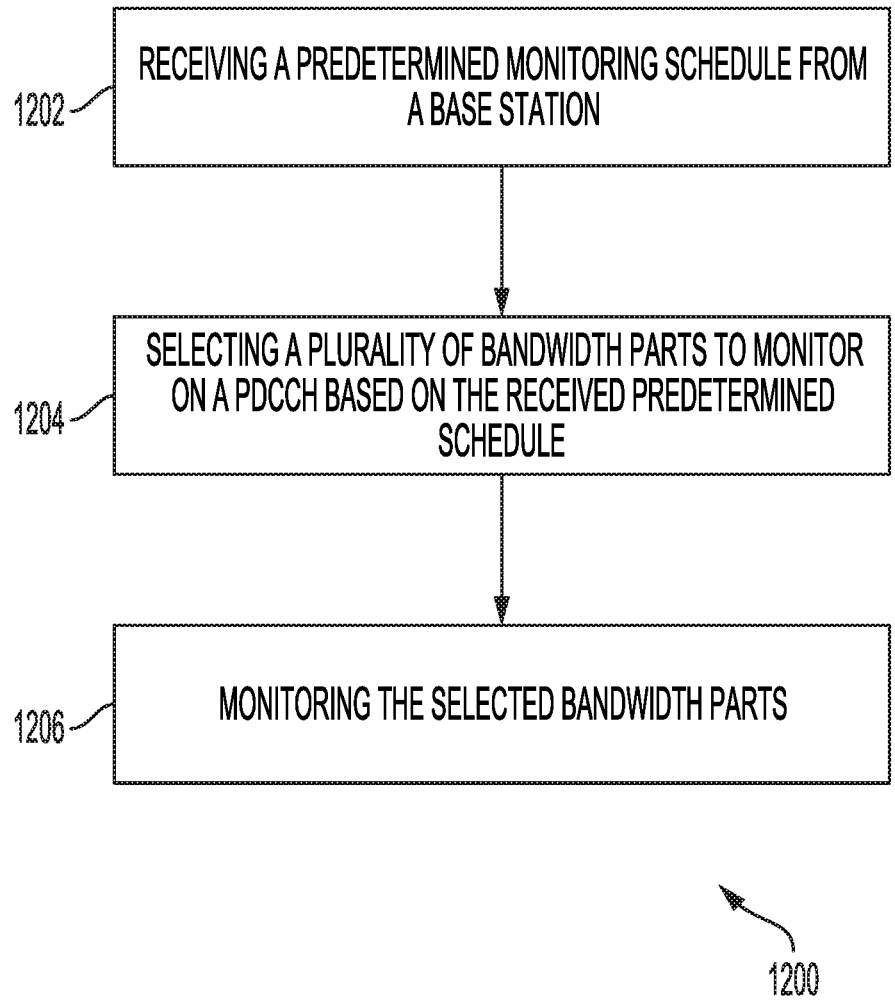
FIGS. 12 and 13 illustrate a method or methods for dynamic downlink monitoring techniques for communications systems in accordance with aspects of the present disclosure.

FIG. 12 shows a flowchart illustrating a method 1200 for dynamic downlink monitoring techniques for communications systems in accordance with aspects of the present disclosure. The operations of method 1200 may be implemented by a UE 215 or its components as described herein. For example, the operations of method 1200 may be performed by a UE communications manager as described with reference to FIGS. 6 and 7. In some examples, a UE 215 may execute a set of codes to control the functional elements of the device to perform the functions described below.

At 1202 the UE 205 may receive a predetermined monitoring schedule from a base station. The operations of 1202 may be performed according to the methods described herein.

At 1204 the UE 215 may select a plurality of bandwidth parts to monitor on a PDCCH based on a received predetermined schedule. The operations of 1204 may be performed according to the methods described herein. In certain examples, aspects of the operations of 1204 may be performed by a UE selection component 730 as described with reference to FIG. 7.

At 1206 UE 215 may monitor selected bandwidth parts.

Figure 13:
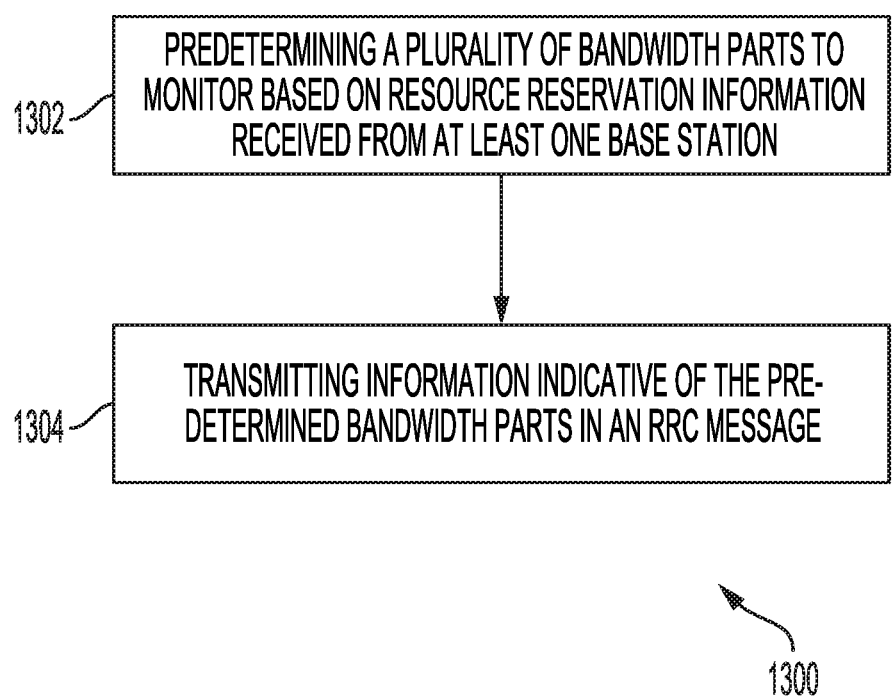

FIG. 13 shows a flowchart illustrating a method 1300 for dynamic downlink monitoring techniques for communications systems in accordance with aspects of the present disclosure. The operations of method 1300 may be implemented by a base station 205 or its components as described herein. For example, the operations of method 1300 may be performed by a base station communications manager as described with reference to FIGS. 9 and 10. In some examples, base station 205 may execute a set of codes to control the functional elements of the device to perform the functions described below.

At 1302 the base station 205 may predetermine a plurality of bandwidth parts to monitor based on resource reservation information received from at least one base station. The operations of 1302 may be performed according to the methods described herein. In certain examples, aspects of the operations of 1302 may be performed by a determining component 1025 as described with reference to FIG. 10.

At 1304 the base station 205 may transmit information indicative of predetermined bandwidth parts in a radio resource control message. The operations of 1304 may be performed according to the methods described herein. In certain examples, aspects of the operations of 1304 may be performed by a transmitter 1020 as described with reference to FIG. 10

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV- DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of wireless communication by a first base station, comprising:
   predetermining a plurality of bandwidth parts to monitor in a plurality of transmission slots based on resource reservation information received from at least a second base station, wherein the plurality of transmission slots include one or more transmission slots for a first type of ultra-reliable low-latency (URLLC) traffic associated with the second base station and one or more transmission slots for a second type of URLLC traffic associated with the second base station; and
   transmitting, to a user equipment (UE) in a radio resource control (RRC) message, information indicating the predetermined plurality of bandwidth parts in the one or more transmission slots; and
   communicating best effort traffic with the UE in at least one of the one or more transmission slots for the second type of URLLC traffic associated with the second base station.

2. The method of claim 1, wherein the predetermined plurality of bandwidth parts correspond to a first bandwidth part associated with the first base station and a second bandwidth part associated with the second base station.

3. The method of claim 2, wherein the information indicative of the predetermined bandwidth parts includes a monitoring schedule to monitor either the first bandwidth part or the second bandwidth part in the plurality of transmission slots.

4. The method of claim 1, wherein the resource reservation information is associated with at least one of time or frequency resources.

5. The method of claim 4, wherein the at least one of time or frequency resources are designated for URLLC traffic.

6. The method of claim 1, wherein the best effort traffic comprises enhanced mobile broadband (eMBB) traffic.

7. The method of claim 1, further comprising receiving an indication from the second base station that the one or more transmission slots for the second type of URLLC associated with the second base station will be unused for the second type of URLLC traffic, wherein communicating best effort traffic with the UE comprises scheduling, based on the indication that the one or more transmission slots for the second type of URLLC traffic associated with the second base station will be unused for the second type of URLLC traffic, the UE to use the one or more transmission slots for the second type of URLLC traffic associated with the second base station for the best effort traffic.

8. The method of claim 1, wherein:
   the first type of URLLC traffic comprises first transmissions of URLLC traffic, and
   the second type of URLLC traffic comprises retransmissions of the URLLC traffic.

9. The method of claim 1, wherein:
   the first type of URLLC traffic comprises periodic URLLC traffic, and
   the second type of URLLC traffic comprises bursty URLLC traffic.

10. A method of wireless communication by a user equipment (UE), comprising:
    receiving, from a first base station, information indicating a predetermined plurality of bandwidth parts to monitor in a plurality of transmission slots, wherein the plurality of transmission slots include one or more transmission slots for a first type of ultra-reliable low-latency (URLLC) traffic associated with a second base station and one or more transmission slots for a second type of URLLC traffic associated with the second base station;
    monitoring the plurality of bandwidth parts in the one or more transmission slots; and
    communicating best effort traffic with the first base station in at least one of the one or more transmission slots for the second type of URLLC traffic associated with the second base station.

11. The method of claim 10, wherein predetermined plurality of bandwidth parts correspond to a first bandwidth part associated with the first base station and a second bandwidth part associated with the second base station.

12. The method of claim 10, wherein predetermined plurality of bandwidth parts correspond to a first bandwidth part associated with the first base station and a second bandwidth part associated with the first base station and the second base station.

13. The method of claim 10, wherein monitoring further comprises monitoring a first bandwidth part in at least one portion of a first transmission slot of the plurality of transmission slots and monitoring a second bandwidth part in at least one portion of a second transmission slot of the plurality of transmission slots.

14. A method of wireless communication by a base station (BS) of a first cell, comprising:
    determining a plurality of transmission slots to reserve for a first type of ultra-reliable low-latency (URLLC) traffic and a second type of URLLC traffic;
    utilizing the one or more transmission slots of the reserved transmission slots for transmission of at least the first type of URLLC traffic;
    determining a number of the plurality of transmission slots unused for the second type of URLLC traffic based on the one or more transmission slots used for at least the first type of URLLC traffic; and sending a resource reservation message to a base station in a second cell indicating the number of the plurality of transmission slots unused for the second type of URLLC traffic.

15. An apparatus for wireless communication, comprising:

a processor, memory in electronic communication with the processor; and instructions stored in the memory and executable by the processor to cause the apparatus to:

receive, from a first base station, information indicating a predetermined plurality of bandwidth parts to monitor in a plurality of transmission slots, wherein the plurality of transmission slots include one or more transmission slots for a first type of ultra-reliable low-latency (URLLC) traffic associated with a second base station and one or more transmission slots for a second type of URLLC traffic associated with the second base station;

monitor the plurality of bandwidth parts in the one or more transmission slots; and communicate best effort traffic with the first base station in at least one of the one or more transmission slots for the second type of URLLC traffic associated with the second base station.

16. The apparatus of claim 15, wherein predetermined plurality of bandwidth parts correspond to a first bandwidth part associated with the first base station and a second bandwidth part associated with the second base station.

17. The apparatus of claim 15, wherein predetermined plurality of bandwidth parts correspond to a first bandwidth part associated with the first base station and a second bandwidth part associated with the first base station and the second base station.

* * * * *